United States Patent
Kim et al.

(10) Patent No.: US 8,942,723 B2
(45) Date of Patent: Jan. 27, 2015

(54) APPARATUS AND METHOD FOR ESTIMATING THE LOCATION OF A TERMINAL USING MULTIPLE LOCATION ESTIMATING SCHEMES

(75) Inventors: Yong Kim, Seoul (KR); Do Hyung Park, Seoul (KR); Eung Sun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 13/592,432

(22) Filed: Aug. 23, 2012

(65) Prior Publication Data

US 2013/0053062 A1     Feb. 28, 2013

(30) Foreign Application Priority Data

Aug. 23, 2011 (KR) ........................ 10-2011-0083987

(51) Int. Cl.
*H04W 24/00* (2009.01)
*G01C 21/20* (2006.01)

(52) U.S. Cl.
CPC .................................. *G01C 21/206* (2013.01)
USPC .................. 455/456.1; 455/456.2; 455/456.3; 455/456.4; 455/456.5; 455/404.2

(58) Field of Classification Search
USPC ................................ 455/456.1–456.6, 404.2
See application file for complete search history.

(56) References Cited

U.S. PATENT DOCUMENTS

| 7,058,411 B2 | 6/2006 | Chen et al. |
| 7,474,977 B2 | 1/2009 | Sato et al. |
| 2008/0091372 A1 | 4/2008 | Sato et al. |
| 2009/0182503 A1* | 7/2009 | Changey et al. ............. 701/221 |
| 2009/0201149 A1* | 8/2009 | Kaji ........................ 340/539.13 |
| 2011/0176494 A1* | 7/2011 | Huang et al. ................. 370/329 |

FOREIGN PATENT DOCUMENTS

| KR | 10-0506097 B1 | 8/2005 |
| KR | 10-0764320 B1 | 10/2007 |

* cited by examiner

*Primary Examiner* — Kiet Doan
*Assistant Examiner* — Edward Zhang
(74) *Attorney, Agent, or Firm* — NSIP Law

(57) ABSTRACT

Provided are an apparatus and method for estimating a location of the terminal using multiple location estimating schemes. The apparatus and method may estimate the location of the terminal more accurately by controlling initial conditions for a plurality of location estimating units, for example, a start time for estimating locations, initial parameters for location estimating schemes, and the like.

22 Claims, 5 Drawing Sheets

APPARATUS AND METHOD FOR ESTIMATING THE LOCATION OF A TERMINAL USING MULTIPLE LOCATION ESTIMATING SCHEMES

CROSS-REFERENCE TO RELATED APPLICATION(S)

This application claims the benefit under 35 USC §119(a) of Korean Patent Application No. 10-2011-0083987, filed on Aug. 23, 2011, in the Korean Intellectual Property Office, the entire disclosure of which is incorporated herein by reference for all purposes.

BACKGROUND

1. Field

The following description relates to an apparatus and method for estimating a location of a terminal using multiple location estimating schemes.

2. Description of Related Art

The propagation of various technologies, the increasing use of a smart phone, and user needs have resulted in an increasing desire for a service for tracking location of a terminal in an indoor environment. A location-based service in an indoor environment may be applied to various fields, for example, a circumference search in a shopping mall or a supermarket, an indoor navigation that may be used in a museum, a factory, or a building, tracking a location of a patient or a doctor in a hospital, a guide terminal for the visually handicapped, and the like. The number of possibilities is unlimited.

Some methods use magnetic field to calculate a location of a terminal. In methods of calculating a location of a terminal by measuring a magnetic field, the location of the terminal may be estimated using a result of measuring various environmental variables.

However, when the location is estimated using a magnetic field affecting the terminal or the moving object, a size, a direction, and/or a pattern of the magnetic field may be the same in multiple locations.

Accordingly, when estimating a location using magnetic field, another place having a similar magnetic field pattern may be incorrectly estimated as the location of the terminal.

SUMMARY

In one aspect, there is provided an apparatus for estimating a location of a terminal using multiple location estimating schemes, the apparatus including a location estimating module configured to estimate first locations of a terminal, based on a magnetic field affecting the terminal, using a plurality of location estimating units that estimate locations using a plurality of location estimating schemes, and a location determining unit configured to determine a second location of the terminal based on the estimated first locations of the terminal.

The apparatus may further comprise an initial condition controlling unit configured to control initial conditions that are applied to the plurality of location estimating units.

The initial condition controlling unit may be configured to determine a start time for estimating locations for each of the plurality of location estimating units.

The initial condition controlling unit may be configured to determine a start time for estimating locations for at least one remaining location estimating unit that does not start estimating locations, based on the estimated first locations of the terminal.

At least one location estimating unit may be configured to estimate a first location of the terminal using a Kalman filter, and the initial condition controlling unit may be configured to determine the start time for estimating locations, for the at least one remaining location estimating unit, based on whether a trace of a variation matrix of the first locations of the terminal is within a predetermined value.

At least one location estimating unit may be configured to estimate a first location of the terminal using a particle filter, and the initial condition controlling unit may be configured to determine the start time for estimating locations, for the at least one remaining location estimating unit, based on the first locations of the terminal and state values of locations of particles included in the particle filter.

In a case in which all of the plurality of location estimating units start estimating locations, the initial condition controlling unit may be configured to initialize a location estimating unit that starts estimating a location to re-start estimating a location.

The initial condition controlling unit may be configured to determine initial parameter values for the plurality of location estimating schemes, respectively, that are used in the plurality of location estimating units.

The initial condition controlling unit may be configured to determine the initial parameter values based on at least one of sensor information, camera information, a cellular signal, a wireless local area network (WLAN) signal, and a Global Positioning System (GPS) signal of the terminal The location determining unit may be configured to determine the second location of the terminal based on an average value of the first locations of the terminal that are estimated using the plurality of location estimating units.

The location determining unit may be configured to determine the second location of the terminal based on a plurality of clusters including the first locations of the terminal that are estimated using the plurality of location estimating units.

A distance between a first cluster and a second cluster, among the plurality of clusters, may be greater than a predetermined value.

The location determining unit may be configured to select a cluster including a greatest number of elements, and determine the second location of the terminal using the elements included in the selected cluster.

The location determining unit may be configured to determine the second location of the terminal, based on an average value of the elements included in the selected cluster.

At least one location estimating unit may be configured to estimate the first location of the terminal using a Kalman filter, and the location determining unit may be configured to determine the second location of the terminal, based on the first locations of the terminal, and a variance matrix of the corresponding first locations of the terminal.

At least one location estimating unit may be configured to estimate the first location of the terminal using a particle filter, and the location determining unit may be configured to determine the second location of the terminal, based on the corresponding first locations of the terminal, and state values of locations of particles included in the particle filter.

Also provided is a method of estimating a location of a terminal using multiple location estimating schemes, the method including estimating first locations of a terminal, based on a magnetic field affecting the terminal, using a plurality of location estimating units that estimate locations using a plurality of location estimating schemes, and determining a second location of the terminal based on the estimated first locations of the terminal.

The method may further comprise controlling initial conditions that are applied to the plurality of location estimating units.

The controlling may comprise determining a start time for estimating locations for each of the plurality of location estimating units.

Also provided is a computer-readable storage medium comprising a program for instructing a computer to perform the method.

Also provided is an apparatus for estimating location of a terminal, the apparatus including an estimator configured to estimate a plurality of locations of the terminal using a plurality of location estimating schemes, and a determiner configured to determine the location of the terminal based on the plurality of locations estimated using the plurality of location estimating schemes.

The apparatus may further comprise an initial condition unit configured to control initial conditions for the estimator to use to estimate the plurality of locations.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

Figure 1:
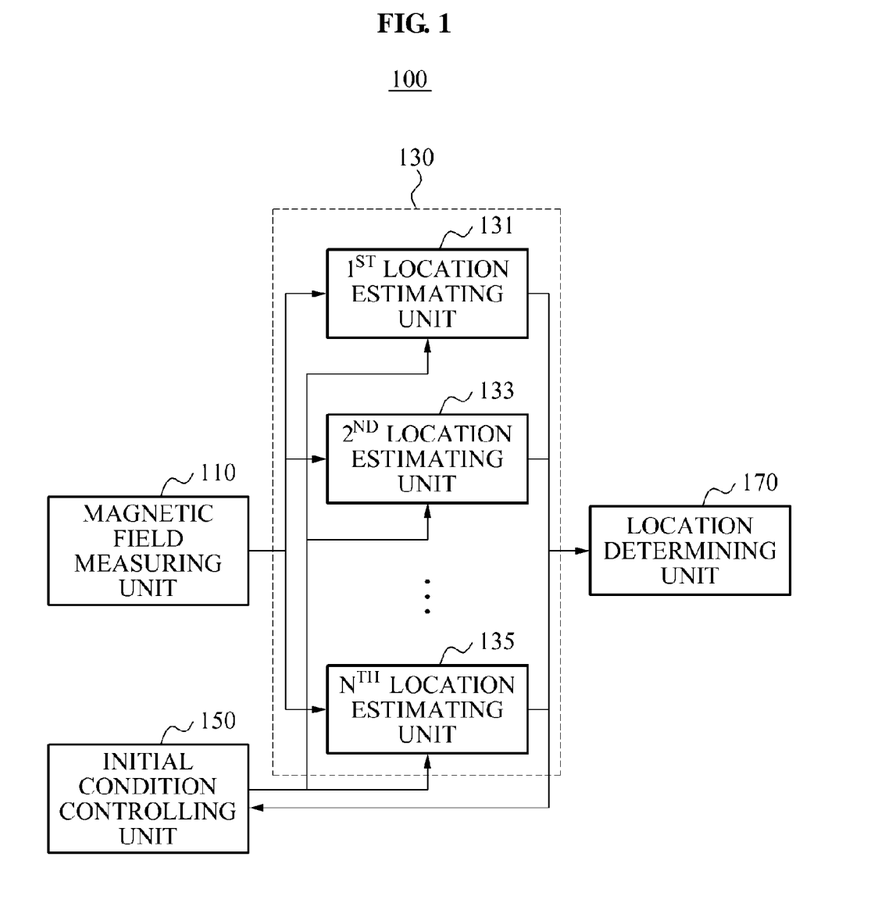
FIG. 1 is a diagram illustrating an example of an apparatus for estimating a location of a terminal using multiple location estimating schemes.

FIG. 1 illustrates an example of an apparatus for estimating a location of a terminal using multiple location estimating schemes.

Referring to FIG. 1, apparatus 100 includes a location estimating module 130 and a location determining unit 170. The apparatus further includes a magnetic field measuring unit 110 and an initial condition controlling unit 150. The apparatus may be, or may be included in a terminal, for example, a computer, a smart phone, a tablet, a navigation device, an appliance, and the like.

The magnetic field measuring unit 110 may measure a magnetic field around a terminal. In this example, the magnetic field measuring unit 110 may also generate a magnetic field map including the location of the terminal, based on a result of measuring the magnetic field.

The location estimating module 130 may estimate a first location of the terminal based on the measured magnetic field, using a plurality of location estimating units, for example, a first location estimating unit 131, a second location estimating unit 133, and an $N^{th}$ location estimating unit 135. The location estimating units may use different location estimating schemes.

The different location estimating schemes may include various continuous location estimating algorithms, for example, a Kalman filter, a particle filter, a Markov localization, a multiple hypothesis localization, and the like.

For example, the first location estimating unit 131, the second location estimating unit 133, and the $N^{th}$ location estimating unit 135 which are included in the location estimating module 130 may estimate locations using different location estimating schemes, respectively. As an example, the first location estimating unit 131 may estimate the location of the terminal using a Kalman filter, the second location estimating unit 133 may estimate the location of the terminal using a particle filter, and the Nth location estimating unit 135 may estimate the location of the terminal using a Markov localization.

In the aforementioned continuous location estimating algorithms, the location of the terminal may be estimated continuously using a result of measuring various environment variables at the moment an object in motion moves. If the location is estimated using a magnetic field affecting the terminal or the moving object, a size and a direction of the magnetic field may be continued, and a similar pattern may be repeated in multiple regions.

In this example, using the Kalman filter, the particle filter, and the like, a variation matrix or a particle may converge to an incorrect location that has a similar pattern of the magnetic field, and thus, the incorrect location may be estimated as the location of the terminal.

The initial condition controlling unit 150 may provide different initial conditions for the plurality of location estimating units, and more precisely, for the location estimating schemes that are used by the plurality of location estimating units. The final location of the terminal may be determined using the results of estimating the locations, obtained by the plurality of location estimating units. Accordingly, although the estimated locations may have a similar size, direction, and/or patterns of the magnetic field, the location of the terminal may be estimated more accurately.

The initial condition controlling unit 150 may control initial conditions that are applied to the plurality of location estimating units. For example, the initial conditions may include a start time for estimating a location, an initial parameter value for a location estimating scheme, that is, a location estimating algorithm, and the like.

For example, the initial condition controlling unit 150 may determine a start time for estimating locations for each of the plurality of location estimating units, for example, the first location estimating unit 131, the second location estimating unit 133, and the $N^{th}$ location estimating unit 135. As another example, the initial condition controlling unit 150 may determine initial parameter values for the different location estimating schemes, respectively, that are used by the plurality of location estimating units.

Examples of a method for determining the start time for estimating a location for each of the plurality of location estimating units is described with reference to FIGS. 2 and 3.

The location determining unit 170 may determine a second location of the terminal based on the estimated first locations of the terminal that are estimated by the plurality of location estimating units. Here, the first locations of the terminal correspond to locations of the terminal that are estimated by the location estimating module 130 which may include the first location estimating unit 131, the second location estimating unit 133, and the $N^{th}$ location estimating unit 135.

The second location of the terminal may correspond to the location of the terminal that is finally determined by the location determining unit 170. For example, the location determining unit 170 may calculate a location value, an error range, a variation matrix, a reliability, and the like, based on the first locations of the terminal that are estimated by the plurality of location estimating units.

The location determining unit 170 may determine the second location of the terminal, using multiple schemes.

As a first example, the location determining unit 170 may determine the second location of the terminal based on an average value of the first locations of the terminal that are estimated by the plurality of location estimating units, for example, the first location estimating unit 131, the second location estimating unit 133, and the $N^{th}$ location estimating unit 135, as expressed by Equation 1.

$$(x^*, y^*, z^*) = \left( \frac{1}{N} \sum_i \bar{x}_i, \frac{1}{N} \sum_i \bar{y}_i, \frac{1}{N} \sum_i \bar{z}_i \right), \quad \text{[Equation 1]}$$

where ($x^*$, $y^*$, $z^*$) denotes an estimated location that is finally calculated, that is, a second location of the terminal, and ($\bar{x}_i$, $\bar{y}_i$, $\bar{z}_i$) denotes an estimated first location that is calculated by an $i^{th}$ location estimating unit.

Also, the location determining unit 170 may obtain a variation matrix as well as the first locations of the terminal when at least one of the plurality of location estimating units estimates a first location of the terminal using a Kalman filter.

In this example, the location determining unit 170 may determine the second location of the terminal based on the estimated first locations of the terminal and a variation matrix of the estimated first locations of the terminal The location determining unit 170 may calculate the second location of the terminal, based on a Gaussian distribution according to the variation matrix, an example of which is expressed by Equation 2.

$$(x^*, y^*, z^*) = E\left[ \left( \frac{1}{N} \sum_i X_i, \frac{1}{N} \sum_i Y_i, \frac{1}{N} \sum_i Z_i \right) \right], \quad \text{[Equation 2]}$$

where ($X_i$, $Y_i$, $Z_i$) where denotes a Gaussian random variable according to the estimated first location ($\bar{x}_i$, $\bar{y}_i$, $\bar{z}_i$) that is calculated by the $i^{th}$ location estimating unit, and a variation matrix $\Sigma_i$. Also, N denotes a number of location estimating units.

In this example, the Gaussian random variable ($X_i$, $Y_i$, $Z_i$) may be expressed by Equation 3.

$$(X_i, Y_i, Z_i) \sim N((\bar{x}_i, \bar{y}_i, \bar{z}_i), \Sigma_i) \quad \text{[Equation 3]}$$

The location determining unit 170 may obtain the first locations of the terminal, and state values of locations of particles included in a particle filter when at least one of the plurality of location estimating units estimates the first location using the particle filter.

In this example, the location determining unit 170 may calculate the second location of the terminal by calculating an average of all the particles included in the particle filter, that are obtained by the plurality of location estimating units, as expressed by Equation 4.

$$(x^*, y^*, z^*) = \left( \frac{1}{NM} \sum_i \sum_j x_i^{[j]}, \frac{1}{NM} \sum_i \sum_j y_i^{[j]}, \frac{1}{NM} \sum_i \sum_j z_i^{[j]} \right), \quad \text{[Equation 4]}$$

where M denotes a number of particles used in one particle filter, and ($x_i^{[j]}$, $y_i^{[j]}$, $z_i^{[j]}$) denotes a state value of a location of a $j^{th}$ particle included in a particle filter of the $i^{th}$ location estimating unit.

Accordingly, the location determining unit 170 may determine the final location of the terminal, that is, the second location of the terminal, using the result of estimating the locations obtained by the plurality of location estimating units.

As a second example, the location determining unit 170 may determine the second location of the terminal using a plurality of clusters included in the first locations of the terminal estimated by the plurality of location estimating units. An example of a method of determining the second location of the terminal using the plurality of clusters is described with reference to FIG. 4.

While not shown in FIG. 1, the apparatus may be or may be included in a device which is capable of displaying the location of the terminal.

Figure 2:
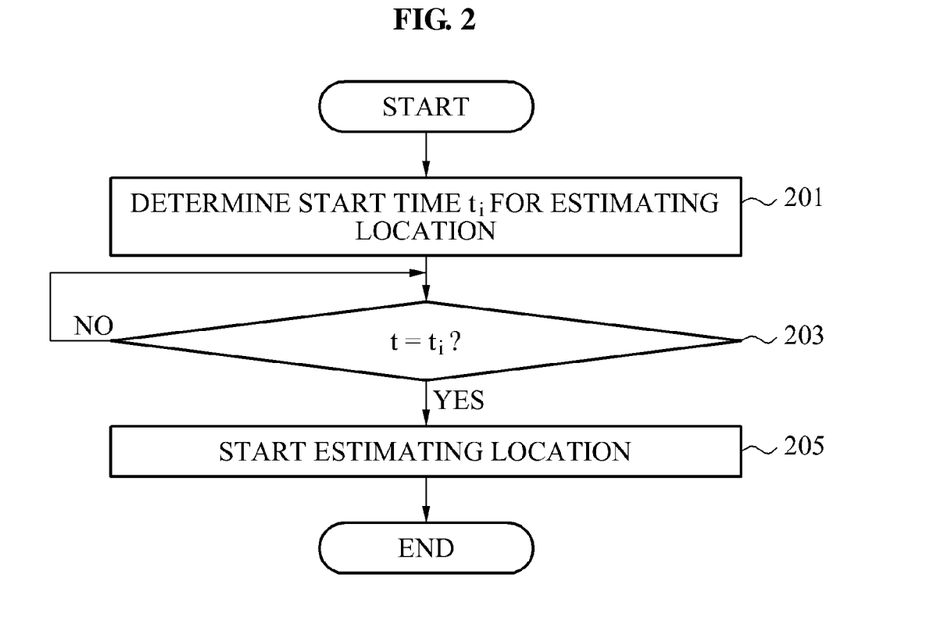
FIG. 2 is a flowchart illustrating an example of a method of determining a start time for estimating a location.

FIG. 2 illustrates an example of a method of determining a start time for estimating a location.

Hereinafter, a start time for estimating a location, for an $i^{th}$ location estimating unit, is defined as $t_i$. The start time may be determined by the initial condition controlling unit 150 shown in FIG. 1.

In 201, the initial condition controlling unit determines a start time $t_i$ for estimating a location, to be different for each of the plurality of location estimating units. For example, the initial condition controlling unit may randomly determine $t_i$, or may determine $t_i$ so that the plurality of location estimating units may start estimating locations at a predetermined time interval as expressed by Equation 5.

$$t_i = t_{i-1} + \Delta t, \quad \text{[Equation 5]}$$

where $\Delta t$ denotes a predetermined time interval, and $t_{i-1}$ denotes a start time for estimating a location for an i-$1^{th}$ location estimating unit.

In 203, the initial condition controlling unit determines whether a time t corresponds to the start time $t_i$ for estimating a location, which is predetermined for each of the plurality of location estimating units.

In this example if the time t satisfies the predetermined start time $t_i$ for estimating a location, the initial condition controlling unit transfers a signal to the corresponding location estimating unit, that is, the $i^{th}$ location estimating unit, so that the $i^{th}$ location estimating unit starts estimating the location of the terminal, in 205.

Conversely, if the time t does not satisfy the predetermined start time $t_i$ for estimating a location, the initial condition controlling unit may delay the performance until the corresponding condition is satisfied, that is, until the time t satisfies the predetermined start time $t_i$ for estimating a location.

Figure 3:
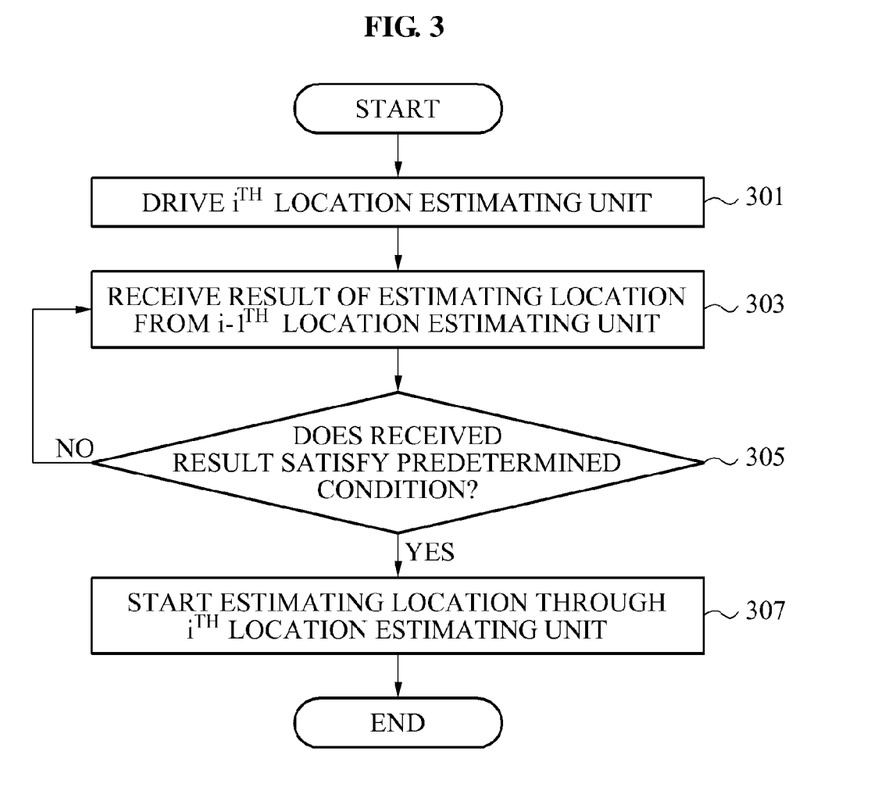
FIG. 3 is a flowchart illustrating another example of a method of determining a start time for estimating a location.

FIG. 3 illustrates another example of a method of determining a start time for estimating a location.

The initial condition controlling unit may determine a start time for estimating locations, for at least one remaining location estimating unit that has yet to start estimating locations, for example, based on results of estimating the locations which are obtained by at least one location estimating unit that first starts estimating locations.

For example, the initial condition controlling unit 150 of FIG. 1 may control the at least one remaining location estimating unit, which has yet to start estimating locations, to start estimating locations in response to an error range of the results of estimating locations decreasing, or in response to a reliability of the results of estimating locations increasing.

In 301, the initial condition controlling unit 150 drives an $i^{TH}$ location estimating unit. For example, the initial condition controlling unit 150 may drive the second location estimating unit 133 that is secondly disposed in FIG. 1, among the plurality of location estimating units included in the location estimating module 130 of FIG. 1. In 303, the initial condition controlling unit 150 receives a result of estimating a location, that is, a location of the terminal estimated by the first location estimating unit 131, from the first location estimating unit 131 that starts estimating the location in advance of the second location estimating unit 133.

In 305, the initial condition controlling unit 150 determines whether the result of estimating the location that is received from the first location estimating unit 131 satisfies a predetermined condition.

In response to the result of estimating the location, received from the first location estimating unit 131, satisfying the predetermined condition, the initial condition controlling unit 150 transfers a signal to the second location estimating unit 133 to start estimating the location of the terminal, in 307.

Conversely, in response to the result of estimating the location, received from the first location estimating unit 131, failing to satisfy the predetermined condition, the initial condition controlling unit 150 may return to 303, and may delay the performance until the result of estimating the location by the first location estimating unit 131 satisfies the predetermined condition.

In this example, the predetermined condition may correspond to a case in which an error range of the result of estimating the location, received from the first location estimating unit 131, decreases, or a case in which a reliability of the corresponding result of estimating the location increases.

For example, at least one of the plurality of location estimating units may estimate the first location of the terminal using a Kalman filter. The initial condition controlling unit 150 may determine a start time for estimating locations, for the at least one remaining location estimating unit, based on whether a trace of a variation matrix of the first locations of the terminal is within a predetermined value.

As another example, at least one of the plurality of location estimating units may estimate the first location of the terminal using a particle filter. The initial condition controlling unit 150 may determine the start time for estimating locations, for the at least one remaining location estimating unit, based on the first locations of the terminal, and state values of locations of particles included in the particle filter. For example, the state values of location of particles may correspond to a sum, an average, a sum of squares of distances between locations of the particles, and the like.

The initial condition controlling unit 150 may control the at least one remaining location estimating unit to start estimating locations when the corresponding first location of the terminal, and the state values of locations of particles included in the particle filter is within a predetermined value.

The initial condition controlling unit 150 may also determine a start time for estimating locations, for the at least one remaining location estimating unit, based on a reliability or a meaningful value related to an error range, in examples of other probability-based continuous location estimating algorithms, rather than the Kalman filter, or the particle filter.

In a case in which all of the plurality of location estimating units starts estimating locations, the initial condition controlling unit 150 may initialize a location estimating unit that starts estimating a location firstly, among the plurality of location estimating units, and then may control the initialized location estimating unit to re-start estimating a location or otherwise re-initialize the location estimating unit.

In addition to the start time for estimating the locations, the initial condition controlling unit 150 may also determine an initial condition, for example, a parameter value, for each of the different location estimating schemes, that is, a parameter value for the algorithms which are used by each of the plurality of location estimating units.

The initial condition controlling unit 150 may determine an initial condition for the corresponding location estimating unit, while simultaneously transmitting a signal to start estimating locations. In this example, the initial condition may correspond to, for example, a variation matrix Σ of infinity that is applicable to the Kalman filter, a state in which particles may be evenly distributed in every location of a magnetic field map, which is applicable to the particle filter, and the like.

The initial condition controlling unit 150 may determine initial parameter values based on, for example, at least one of sensor information, camera information, a cellular signal, a wireless local area network (WLAN) signal, a Global Positioning System (GPS) signal of the terminal, and the like. If a rough location in a wide error range is recognized in advance using other methods, instead of location estimating algorithms such as the GPS signal, the WLAN signal, and the like, the initial condition controlling unit 150 may control the initial parameter values under an assumption that particles may be located in the variation matrix having a limited value, or around the rough location.

As described herein, by continuously using the results of estimating locations obtained by the plurality of location estimating units, an error that may be generated by an incorrectly estimated location may be reduced, and a robust method of estimating a location that may prevent the incorrect estimation may be provided.

Figure 4:
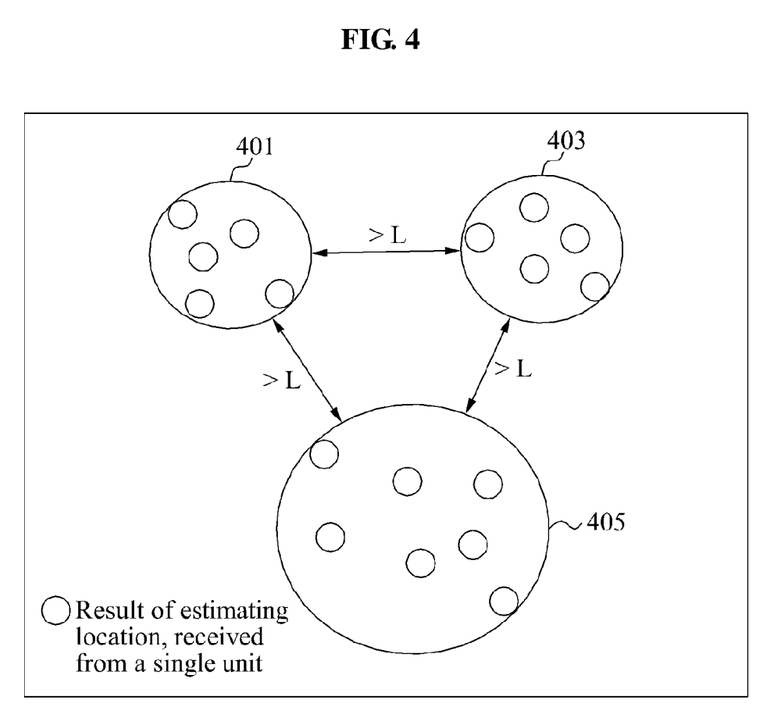
FIG. 4 is a diagram illustrating an example of a method of performing clustering.

FIG. 4 illustrates an example of a method of performing clustering. The method may be performed by the location determining unit 170 shown in FIG. 1.

The location determining unit may determine a second location of the terminal using a plurality of clusters 401, 403, and 405 including first locations of the terminal, obtained by a plurality of location estimating unit, respectively. In this example, the location determining unit may generate the plurality of clusters using various clustering schemes. An example of a clustering scheme is a Greedy algorithm.

For example, the location determining unit may control a distance between a first cluster 401 and a second cluster 403, or a distance between the second cluster 403 and a third cluster, to be constantly greater than a predetermined distance L between clusters.

The location determining unit may select a cluster that includes a greatest number of elements, in this instance, the third cluster 405, and may determine the second location of the terminal using the elements included in the selected third cluster 405.

In FIG. 4, the elements are represented by circles within the clusters. Here, the elements indicate the first locations of the terminal that are estimated, for example, by the plurality of location estimating units.

The location determining unit may select a cluster including the greatest number of resulting values after clustering, and may determine the second location of the terminal, based on an average value of the elements included in the selected cluster.

In addition, if at least one of the plurality of location estimating units estimates the first location of the terminal using a Kalman filter, the location determining unit may determine the second location of the terminal based on the first locations of the terminal, and a variation matrix of the first locations of the terminal.

As another example, if the at least one of the plurality of location estimating units estimates the first locations of the terminal using a particle filter, the location determining unit may determine the second location of the terminal based on the first locations of the terminal, and state values of locations of particles included in the particle filter. In this example, the state values of the locations may correspond to a sum, an average, a sum of squares of distances between locations of the particles, and the like.

Figure 5:
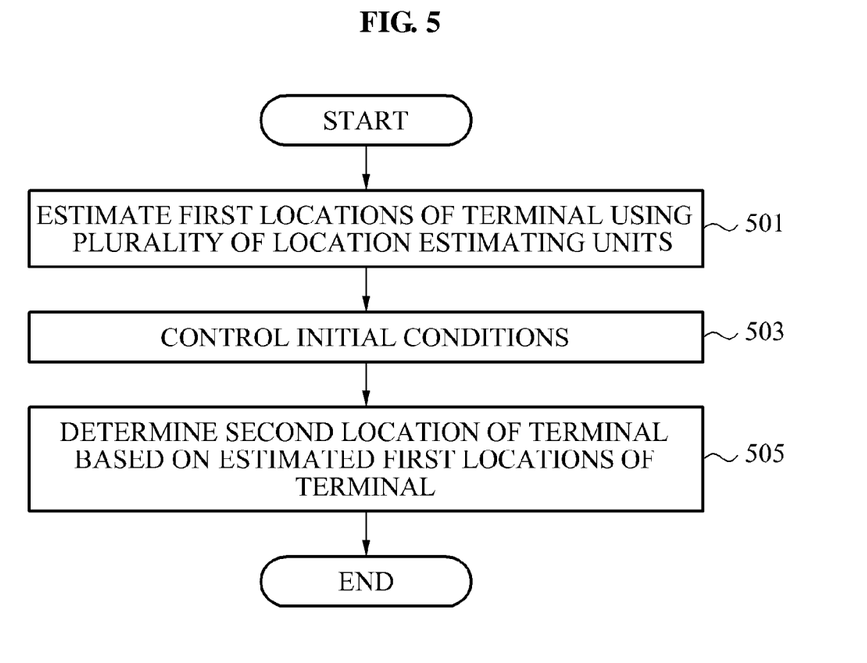
FIG. 5 is a flowchart illustrating an example of a method of estimating a location of a terminal using multiple location estimating schemes.

FIG. 5 illustrates an example of a method of estimating a location of a terminal using multiple location estimating schemes.

For convenience, an apparatus for estimating the location of the terminal using multiple location estimating schemes may be hereinafter referred to as a 'location estimating apparatus.' Referring to FIG. 5, in 501, the location estimating apparatus estimates first locations of the terminal based on a magnetic field affecting the terminal, using a plurality of location estimating units. The plurality of location estimating units may use a plurality of location estimating schemes.

In 503, the location estimating apparatus controls initial conditions that are applied to the plurality of location estimating units. For example, the location estimating unit may determine a start time for estimating locations, for each of the plurality of location estimating units, and initial parameters for the different location estimating schemes, respectively, that are used in the plurality of location estimating units.

In 505, the location estimating apparatus determines a second location of the terminal based on the first locations of the terminal that are estimated by the plurality of location estimating units, respectively.

According to various examples herein, by determining location of the terminal based on the results of estimating locations that are obtained by the plurality of location estimating units, respectively, an error of estimating locations may be reduced, and also a more robust result of estimating the location of the terminal may be provided.

According to various examples herein, by controlling the initial conditions for the plurality of location estimating units, for example, a start time for estimating locations, initial parameters for the location estimating schemes, and the like, the location of the terminal may be estimated more accurately.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for estimating a location of a terminal using multiple location estimating schemes, the apparatus comprising:
   a location estimating module configured to estimate first locations of a terminal, based on a magnetic field affecting the terminal, using a plurality of location estimating units configured to estimate the first locations using a plurality of location estimating schemes;

a location determining unit configured to determine a second location of the terminal based on the estimated first locations of the terminal; and
an initial condition controlling unit configured to
receive a result of estimating the location of the terminal from an $i-1^{TH}$ location estimating unit, among the plurality of location estimating units, i being a number of one of the plurality of location estimating units,
determine whether the received result satisfies a predetermined condition, and
start estimating the location of the terminal, using an $i^{TH}$ location estimating unit, among the plurality of location estimating units.

2. The apparatus of claim 1, wherein the initial condition controlling unit is configured to control initial conditions that are applied to the plurality of location estimating units.

3. The apparatus of claim 2, wherein the initial condition controlling unit is configured to determine a start time for estimating locations for each of the plurality of location estimating units.

4. The apparatus of claim 2, wherein the initial condition controlling unit is configured to determine a start time for estimating locations for at least one remaining location estimating unit that does not start estimating locations, among the plurality of location estimating units, based on the estimated first locations of the terminal.

5. (The apparatus of claim 4, wherein:
at least one of the plurality of location estimating units is configured to estimate a first location of the terminal using a Kalman filter; and
the initial condition controlling unit is configured to determine the start time for estimating locations, for the at least one remaining location estimating unit, based on whether a trace of a variation matrix of the first locations of the terminal is within a predetermined value.

6. The apparatus of claim 4, wherein:
at least one of the plurality of location estimating units is configured to estimate a first location of the terminal using a particle filter; and
the initial condition controlling unit is configured to determine the start time for estimating locations, for the at least one remaining location estimating unit, based on the first locations of the terminal and state values of locations of particles included in the particle filter.

7. The apparatus of claim 2, wherein, in response to all of the plurality of location estimating units starting to estimate locations, the initial condition controlling unit is configured to initialize a location estimating unit that starts estimating the location, among the plurality of location estimating units, to re-start estimating the location.

8. The apparatus of claim 2, wherein the initial condition controlling unit is configured to determine initial parameter values for the plurality of location estimating schemes, respectively, which are used in the plurality of location estimating units.

9. The apparatus of claim 8, wherein the initial condition controlling unit is configured to determine the initial parameter values based on sensor information, or camera information, or a cellular signal, or a wireless local area network signal, or a global positioning system signal, or any combination thereof, of the terminal.

10. (The apparatus of claim 1, wherein the location determining unit is configured to determine the second location of the terminal based on an average value of the first locations of the terminal that are estimated using the plurality of location estimating units.

11. The apparatus of claim 1, wherein the location determining unit is configured to determine the second location of the terminal based on a plurality of clusters including the first locations of the terminal that are estimated using the plurality of location estimating units.

12. The apparatus of claim 11, wherein a distance between a first cluster and a second cluster, among the plurality of clusters, is greater than a predetermined value.

13. The apparatus of claim 11, wherein the location determining unit is configured to:
select a cluster including a greatest number of elements from the plurality of clusters, and
determine the second location of the terminal using the elements included in the selected cluster.

14. The apparatus of claim 13, wherein the location determining unit is configured to determine the second location of the terminal, based on an average value of the elements included in the selected cluster.

15. The apparatus of claim 1, wherein:
at least one of the plurality of location estimating units is configured to estimate a first location of the terminal using a Kalman filter; and
the location determining unit is configured to determine the second location of the terminal, based on the first locations of the terminal, and a variance matrix of the corresponding first locations of the terminal.

16. The apparatus of claim 1, wherein:
at least one of the plurality of location estimating units is configured to estimate a first location of the terminal using a particle filter; and
the location determining unit is configured to determine the second location of the terminal, based on the corresponding first locations of the terminal, and state values of locations of particles included in the particle filter.

17. A method of estimating a location of a terminal using multiple location estimating schemes, the method comprising:
estimating first locations of a terminal, based on a magnetic field affecting the terminal, using a plurality of location estimating units configured to estimate the first locations using a plurality of location estimating schemes;
determining a second location of the terminal based on the estimated first locations of the terminal;
receiving a result of estimating the location of the terminal from an $i-1^{TH}$ location estimating unit, among the plurality of location estimating units, i being a number of one of the plurality of location estimating units;
determining whether the received result satisfies a predetermined condition; and
starting to estimate the location of the terminal, using an $i^{TH}$ location estimating unit, among the plurality of location estimating units.

18. The method of claim 17, further comprising: controlling initial conditions that are applied to the plurality of location estimating units.

19. The method of claim 18, wherein the controlling comprises determining a start time for estimating locations for each of the plurality of location estimating units.

20. A non-transitory computer-readable storage medium comprising a program for instructing a computer to perform the method of claim 17.

21. An apparatus for estimating a location of a terminal, the apparatus comprising:
a plurality of location estimators configured to estimate a plurality of locations of the terminal using a plurality of location estimating schemes;

a determiner configured to determine the location of the terminal based on the plurality of locations estimated using the plurality of location estimating schemes; and an initial condition controller configured to receive a result of estimating the location of the terminal from an $i-1^{TH}$ location estimator, among the plurality of location estimators, i being a number of one of the plurality of location estimating units, determine whether the received result satisfies a predetermined condition, and start estimating the location of the terminal, using an $i^{TH}$ location estimator, among the plurality of location estimating units.

22. The apparatus of claim 21, wherein the initial condition controller is configured to control initial conditions for the plurality of location estimators to use to estimate the plurality of locations.

* * * * *